(12) United States Patent
Waser

(10) Patent No.: US 8,659,236 B2
(45) Date of Patent: Feb. 25, 2014

(54) CIRCUIT ARRANGEMENT AND METHOD FOR DRIVING AN ELECTRICAL LOAD

(75) Inventor: Karl Georg Waser, Graz (AT)

(73) Assignee: AMS AG, Unterpremstaetten (AT)

( * ) Notice: Subject to any disclaimer, the term of this patent is extended or adjusted under 35 U.S.C. 154(b) by 424 days.

(21) Appl. No.: 12/985,606

(22) Filed: Jan. 6, 2011

(65) Prior Publication Data

US 2011/0169420 A1    Jul. 14, 2011

(30) Foreign Application Priority Data

Jan. 8, 2010   (DE) .......................... 10 2010 004 199

(51) Int. Cl.
*H05B 37/00*    (2006.01)

(52) U.S. Cl.
USPC ............................ 315/291; 315/307; 315/308

(58) Field of Classification Search
USPC .......................... 315/291, 307, 224, 308, 246
See application file for complete search history.

(56) References Cited

U.S. PATENT DOCUMENTS

| | | |
|---|---|---|
| 4,988,924 A | 1/1991 | Maurer et al. |
| 2006/0232394 A1 | 10/2006 | Patel |
| 2009/0108775 A1 | 4/2009 | Sandner et al. |
| 2011/0085576 A1* | 4/2011 | Crawford et al. .......... 372/38.07 |
| 2011/0156596 A1* | 6/2011 | Salsbury ...................... 315/152 |

FOREIGN PATENT DOCUMENTS

| | | |
|---|---|---|
| DE | 37 36 222 | 5/1989 |
| DE | 19936214 A1 | 3/2001 |
| DE | 101 47 504 | 4/2003 |
| DE | 10 2006 015053 | 10/2006 |
| DE | 102006015053 A1 | 10/2006 |
| DE | 10 2005 001 024 | 11/2006 |
| DE | 102007052880 A1 | 5/2009 |
| DE | 10 2007 051 793 | 8/2009 |

* cited by examiner

*Primary Examiner* — David H Vu
(74) *Attorney, Agent, or Firm* — McDermott Will & Emery LLP

(57) ABSTRACT

A circuit arrangement for driving an electrical load comprises a connection node (LED) for connecting the electrical load and a control device (Ctrl) that is coupled to the connection node (LED) to drive the electrical load. A detection circuit (Det) is coupled to the connection node (LED) for detecting a trigger signal (trig) at the connection node (LED) and coupled to the control device (Ctrl) via a measurement channel (Mes).

16 Claims, 1 Drawing Sheet

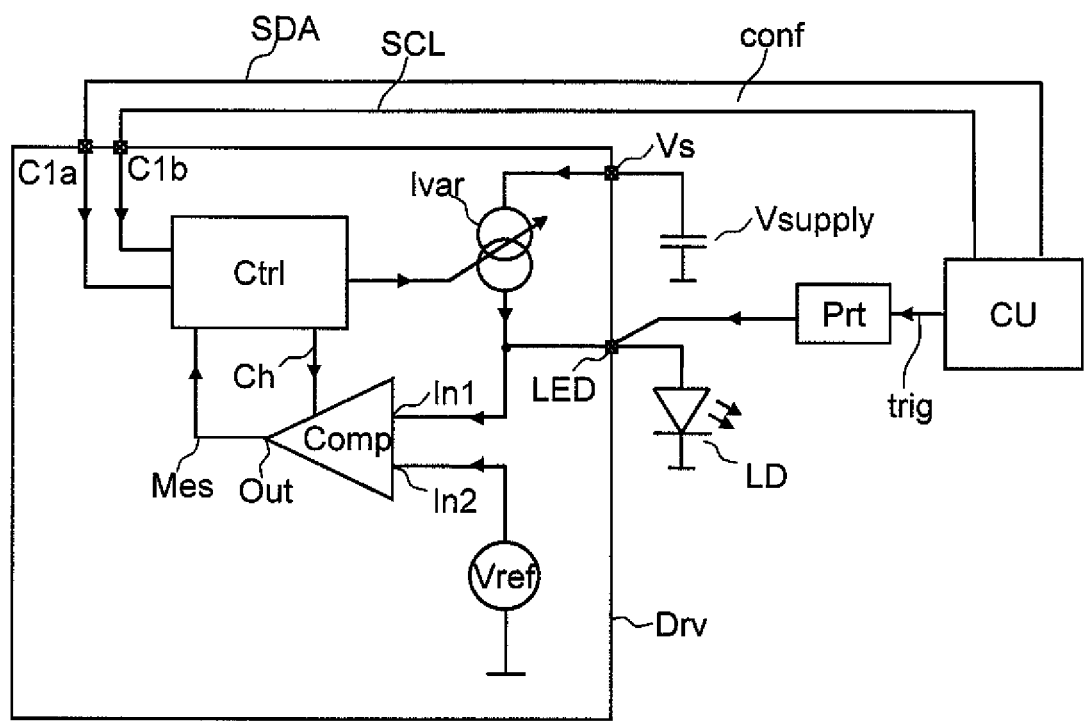

CIRCUIT ARRANGEMENT AND METHOD FOR DRIVING AN ELECTRICAL LOAD

RELATED APPLICATIONS

This application claims the priority of German application no. 10 2010 004 199.8 filed Jan. 8, 2010, the entire content of which is hereby incorporated by reference.

FIELD OF THE INVENTION

The present invention relates to a circuit arrangement and a method for driving an electrical load.

BACKGROUND OF THE INVENTION

Such circuits can be used in portable telephones and digital cameras to operate light-emitting diodes, LEDs for short. LEDs are used for background lighting, but are now also standard as a flash device in mobile telephones. Due to the increasing variety of functions that are being combined in a single device, there is also a high demand for a compact and space-saving design for all of the components.

SUMMARY OF THE INVENTION

An object of the present invention is to provide a circuit arrangement for driving an electrical load, wherein this circuit arrangement is more compact and more space-saving.

In one embodiment, a circuit arrangement for driving an electrical load has a connection node for connecting the electrical load. The circuit arrangement further comprises a control device that is coupled to the connection node for driving the electrical load. The circuit arrangement further comprises a detection circuit that is coupled to the connection node for detecting a trigger signal, and to the control device via a measurement channel.

The detection circuit is used to monitor the trigger signal at the connection node. If a corresponding signal is present at the connection node, this is indicated via the measurement channel of the control device. Subsequently the control device itself can drive an electrical load at the connection node. This happens, for example, by superimposing a load current on the connection node, which then drives a lighting means such as an LED that may be connected thereto.

By combining the detection circuit and the control device, it is possible to assign two functions to the sole connection node other than the supply terminals, and thus to save one pin in an integrated design. The connection node serves as a monitor for monitoring a trigger event and subsequently as a supply node for a connected electrical load. Such an electrical load can comprise, in particular, an LED or other suitable lighting means. Other components are also possible, however, such as signal generators that signal certain events, such as a call to a mobile telephone, by vibrations or by means of a loudspeaker.

Due to the double functionality of the connection node, a more compact and space-saving design of the circuit arrangement can advantageously be achieved. A second connection node is therefore not necessary.

In another embodiment, the control device comprises a controllable power source that is coupled to the connection node. The controllable power source is additionally connected to a supply node which allows it to be supplied with power.

The control device can control the controllable power source in such a manner that a load current is preferably present at the connection node.

Due to the controllable power source, the load current can preferably be available at the connection node to drive a lighting means or other electrical load. The control allows the current not to be provided continuously but only during adjustable time sections. If, for example, a lighting means such as an LED is operated with the circuit arrangement, then a flash device can be realized in this manner. A flash is not continuously desired in this case, but only during definable time periods, which are specified, for example, by a user.

The controllable power source can alternatively be implemented as a controllable current source. The controllable power source can alternatively also be used as a controllable current sink.

In another advantageous embodiment, the detection circuit comprises a comparator. The comparator is connected via a first input to the connection node and also connected via a second input to a reference voltage source. One output of the comparator is connected via the measurement channel to the control device.

The comparator compares the trigger signal present at the connection node to the reference voltage source. The signal that has originated from the comparison is provided by the measurement channel to the control device.

It is advantageously possible with the aid of the comparator to implement a simple and space-saving detection circuit. Suitable comparators can in turn also be controllable and generate an internal reference voltage, for example. In this manner a simple and compact integration is possible, preferably on an integrated circuit. The comparator can additionally be adjusted such that the signal originating from the comparison is characteristic of the signal present at the connection node. Only if the signal present at the connection node has exceeded a defined value, for example, and thus is interpreted as a trigger signal, is the control unit driven such that it in turn drives an electrical load connectable to the connection node. This can advantageously prevent voltage peaks from causing the electrical load to be operated, for example.

In another embodiment, the comparator is controllably connected via an activation path to the control device.

For example, the comparator can be switched on and off by the control device via the activation path. The comparator is thus set up, on one hand, such that it expects a signal at the connection node and monitors accordingly. On the other hand, if this is not to be expected, because a flash event is not desired by the user, then the comparator is switched off and there is no detection at the connection node.

In this manner it is possible to activate the comparator only on certain occasions or at certain times. The signal is therefore detected only on these occasions or at these times, which allows a power-saving operation.

In another embodiment, the control device is configurable via at least one control terminal on the control device.

Parameters can be set at the control device by means of the control connection. For example, the current level and current duration and possibly other parameters as well for driving a light-emitting diode can advantageously be set. Thus it continues to be possible for a user to adjust the properties of an LED for use as a flash, for example. These include, in particular, flash intensity, flash duration or flash sequence, for example, a pre-flash for redeye correction.

In another embodiment, a control unit is provided that is connected to the at least one control terminal and to the connection node.

The control unit adjusts the parameters at the control terminal of the control device and represents the interface for the user.

In this manner it is possible for the user to conveniently set all adjustable parameters, but also to influence the trigger signal at the connection node in such a manner that a trigger event is initiated, for example, the flashing of an LED by activating a trigger.

In another embodiment, a protection circuit is provided that connects the connection node and the control unit. The protection circuit preferably comprises diodes and/or resistors for limiting the current.

The protection circuit prevents excessively high offset currents from appearing at the connection node. Such offset currents can appear due to unequal voltage values, which are present at the connection node and also supplied by the control unit.

The control unit and the protection circuit can be provided externally from the remainder of the arrangement, which is also referred to as a driver circuit.

In another embodiment, the circuit arrangement is configured as an integrated circuit.

A configuration of the circuit arrangement as an integrated circuit allows a compact and space-saving implementation, with CMOS components, for example.

In another embodiment, at least one lighting means is connected to the connection node. Such a lighting means is for example, a light-emitting diode or LED.

In an exemplary embodiment of a method for driving an electrical load, a trigger signal is monitored in a first operating phase at a connection node of the circuit arrangement for driving an electrical load. In a second operating phase, a load current is provided at the connection node whenever the monitored trigger signal has exceeded a predetermined value.

The connection node is operated with a double functionality by a succession of the first and second operating phase. It thus serves as a measurement point for the monitored trigger signal, and on the other hand, as a supply node for connecting an electrical load. In this manner the method for driving the electrical load can be implemented compactly and in a space-saving manner, preferably in an integrated circuit.

In one embodiment of the method, the monitored trigger signal is compared to a reference signal in the first operating phase. The load current is provided in the second operating phase as a function of the comparison.

In one embodiment of the method, the first operating phase is activated by a configuration signal.

It is possible in this manner to initialize the method only on certain occasions or at certain times. This can be initiated by a user, for example, by activating a flash mode in a camera when the method is used for driving a lighting means or the like. The trigger signal is also detected only on these occasions or at these times, which allows a power-saving implementation of the method.

The configuration signal is, for example, a logic state of a suitable interface such as an inter-integrated circuit (SDA/SCL). The first operating phase is thus activated via the control terminal according to an interface standard.

In one embodiment of the method, the provision of the load current at the connection node is controllable by the configuration signal.

The configuration signal controls the level, duration and temporal sequence of the load current, for example. When it is used as a lighting means such as a flash, for example, it thus continues to be possible for a user to control its properties. These include, in particular, flash intensity, flash duration or flash sequence, for example, a pre-flash for redeye connection.

The invention will be described in detail below for one embodiment with reference to a FIGURE. Elements with identical functions or effects bear identical reference numbers.

BRIEF DESCRIPTION OF THE SINGLE DRAWING

FIG. 1 shows an embodiment of a circuit arrangement for driving an electrical load according to the invention.

DETAILED DESCRIPTION OF THE SINGLE DRAWING

FIG. 1 shows an embodiment of a circuit arrangement for driving an electrical load according to the invention. The circuit arrangement comprises a driver Drv, a protection circuit Prt and a control unit CU. The control unit CU is connected to the driver Drv via an interface SDA, SCL comprising a first and second control terminal C1a and C1b. The control unit CU is additionally coupled via the protection circuit Prt to the connection node LED of the driver Drv.

The driver Drv comprises a control device Ctrl, a controllable current source Ivar, a comparator Comp with a reference voltage source Vref, as well as a connection node LED for connecting an electrical load and a connection node Vs for connecting a supply voltage. The controllable current source Ivar is connected to the connection node Vs for a supply voltage, the connection node LED and a first input In1 of the comparator. The controllable current source Ivar is further coupled via a control input to the control device Ctrl. The comparator Comp is coupled via one output to the control device Ctrl and via an activation path Ch to the control device Ctrl. A second input In2 of the comparator Comp is coupled to ground with the reference voltage source Vref. A light-emitting diode LD is connected to the connection node LED. A supply voltage Vsupply is connected at the connection node Vs for a supply voltage.

The control unit CU can include a micro controller, a micro processor, a baseband processor or a switch. The control unit CU has essentially two functions. First, it allows various parameters to be set on the driver Drv. This takes place via the interface SDA, SCL and the first and second control terminals C1a and C1b. For this purpose, the control unit CU provides suitable register bits that adjust, for example, the current level and the current duration for the driver Drv. A second function of the control unit CU is the provision of a trigger signal trig that is present at the connection node LED via the protection circuit Prt, and causes, for example, the connected light-emitting diode LD to flash.

For that purpose, the control unit CU first causes the driver Drv to activate additional components. This can be adjusted, for example, by a user of a mobile telephone or a digital camera at the control unit CU by suitable means such as a program menu. Among the components that can be activated are the supply voltage Vsupply and the comparator Comp, which is activated via the activation path Ch. Subsequently, the comparator Comp monitors the signal present at the connection node LED by comparison with a reference voltage Vref in the range of 500 to 800 mV, for example.

The protection circuit Prt can comprise a diode or a resistor. In an embodiment, the diode or the resistor limits the current flowing to or from the control unit CU. The protection circuit Prt prevents too high offset currents from flowing through the connection line between the output terminal of the control unit CU and the connection node LED due to unequal voltage levels at the connection node LED and the output terminal of the control unit CU.

The control device Ctrl comprises logical gates. In an embodiment, the control device Ctrl may comprise a timer. The timer is realized as a flash timeout timer. The timer ensures a shutdown of the controllable current source Ivar on timer over-roll.

In an embodiment, the comparator Comp may operate without using an hysteresis. Preferably, the comparator Comp may operate using an hysteresis.

If a flash event is indicated at the control unit CU, by pressing a trigger on a mobile phone or a digital camera, for example, the control unit CU causes a trigger signal to be present at the connection node LED. The comparator Comp transmits a corresponding comparison signal via the measurement channel Mes to the control device Ctrl. The control device Ctrl then adjusts the current source Ivar to control the current supplied to the connection node LED and thus supplies the connected light-emitting diode LD, which then flashes, for example. The control device Ctrl switches the current source Ivar on and off such that the current source Ivar supplies the current in the on-state of the current source Ivar and no current in the off-state of the current source Ivar to the connection node LED.

The parameters of the control device Ctrl of the driver DrV, previously set by the control unit CU via the first and second control terminals C1a and C1b, define the current level provided by the controllable current source Ivar and the current duration, for example. In this way, the flash intensity, flash duration and flash sequence can be adjusted, for example.

Due to the combination of the comparator Comp and the configurable control device Ctrl, it is possible to assign two functions to the connection node LED. The connection node LED serves as a monitor for monitoring a trigger event and subsequently as a supply node for the connected light-emitting diode LD. A more compact and space-saving configuration of the circuit arrangement can be achieved by the connection node LED. A second connection node is therefore not necessary.

The interface SDA, SCL can be implemented as shared or not shared. Typical standards are the Serial Peripheral Interface (SPI) or, as shown in the present case, an inter-integrated circuit ($I^2C$).

As an alternative to the controllable current source Ivar, a controllable current sink could be provided.

In another embodiment, not shown, the control unit Ctrl comprises an internal debounce circuit.

The debounce circuit is used to avoid voltage peaks, which could disrupt a correct driving of an electrical load by the circuit arrangement.

In another embodiment that is not shown, the control unit CU comprises a baseband of a communications unit, a camera processor or a switching device.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

I claim:

1. A circuit arrangement for driving an electrical load, comprising:
a connection node for connecting the electrical load;
a control device that is coupled to the connection node for driving the electrical load; and
a detection circuit that is coupled to the connection node for detecting a trigger signal at the connection node during a first operating phase, and coupled to the control device via a measurement channel, wherein during a second operating phase a load current is provided at the connection node, when the detected trigger signal exceeds a predetermined value.

2. The circuit arrangement according to claim 1, wherein the control device is coupled via a controllable current source to the connection node, and wherein the controllable current source is connected to a supply node to supply the controllable current source.

3. The circuit arrangement according to claim 1, wherein the detection circuit comprises a comparator that
is connected via a first input to the connection node,
is connected via a second input to a reference voltage source, and
is coupled at one output to the control device via the measurement channel.

4. The circuit arrangement according to claim 3, wherein the comparator is controllably connected via an activation path to the control device.

5. The circuit arrangement according to claim 1, wherein the control device is adapted to be configured via at least one control terminal on the control device.

6. The circuit arrangement according to claim 5, wherein a control unit is connected to the at least one control terminal and to the connection node.

7. The circuit arrangement according to claim 6, wherein a protection circuit connects the connection node and the control unit.

8. The circuit arrangement according to claim 1 that is constructed as an integrated circuit.

9. The circuit arrangement according to claim 1, wherein at least one lighting means is connected to the connection node.

10. A method for driving an electrical load, comprising:
a first operating phase, in which a signal is monitored by a detection circuit coupled to a connection node of a circuit arrangement for driving the electrical load; and
a second operating phase, in which a load current is provided at the connection node via a control device coupled to the connection node, when the monitored trigger signal exceeds a predetermined value.

11. The method according to claim 10,
wherein the monitored trigger signal is compared to a reference signal in the first operating phase, and
wherein in the second operating phase, the load current is provided as a function of the comparison.

12. The method according to claim 10, wherein the first operating phase is activated by a configuration signal.

13. The method according to claim 10, wherein the provision of the load current at the connection node can be controlled by the configuration signal.

14. A circuit arrangement for driving an electrical load, comprising:
a connection node for connecting the electrical load;
a control device that is coupled to the connection node for driving the electrical load; and
a detection circuit that is coupled to the connection node for detecting a trigger signal at the connection node, during a first operating phase, in which the trigger signal can be provided by a control unit, and which is coupled to the control device via a measurement channel, wherein during a second operating phase a load current is provided at the connection node, when the detected trigger signal exceeds a predetermined value.

15. A circuit arrangement for driving an electric load, comprising:
- a connection node for connecting the electrical load;
- a control device that is coupled to the connection node for driving the electrical load; and
- a detection circuit that is coupled to the connection node for detecting a trigger signal at the connection node and coupled to the control device via a measurement channel,
- wherein the detection circuit comprises a comparator that
  - is connected via a first input to the connection node,
  - is connected via a second input to a reference voltage source, and
  - is coupled at one output to the control device via the measurement channel.

16. The circuit arrangement according to claim 15, wherein the comparator is controllably connected via an activation path to the control device.

* * * * *